United States Patent [19]

Meier

[11] 4,253,052
[45] Feb. 24, 1981

[54] STEPPING MOTOR CONTROL CIRCUIT

[75] Inventor: Walter Meier, Losone, Switzerland

[73] Assignee: A.G. für Industrielle Elektronik AGIE Losone bei Locarno, Losone, Switzerland

[21] Appl. No.: 12,115

[22] Filed: Feb. 14, 1979

[30] Foreign Application Priority Data

Mar. 8, 1978 [CH] Switzerland ............. 2545/78

[51] Int. Cl.³ .............................................. G05B 19/40
[52] U.S. Cl. ..................................... 318/696; 318/685
[58] Field of Search ...................... 318/696, 685, 138

[56] References Cited

U.S. PATENT DOCUMENTS

| 3,486,096 | 12/1969 | Van Cleave | 318/696 |
| 3,560,821 | 2/1971 | Beling | 318/138 |
| 3,684,934 | 8/1972 | Loyzim | 318/696 |
| 3,826,966 | 7/1974 | Nagasaka et al. | 318/696 |
| 4,127,801 | 11/1978 | Leenhouts | 318/696 |
| 4,164,697 | 8/1979 | Everett | 318/696 |

OTHER PUBLICATIONS

"The Stepping Motor Handbook", published by Sigma Instruments, Inc., Braintree, Mass., U.S.A., (copy 1972), German Edition, 1973.

Primary Examiner—B. Dobeck
Attorney, Agent, or Firm—Frishauf, Holtz, Goodman & Woodward

[57] ABSTRACT

The circuit is for driving motors in which there is access to all the ends of the motor winding sections. The circuit is of the type having a set of drive circuit units connected together as a gang in parallel between power source terminals. Each unit includes in series a winding section and a transistor control switch. There is additionally provided an auxiliary circuit with an auxiliary winding and resistor combination which substantially matches the motor winding and resistor combination impedance. The auxiliary winding is used to store the energy from a motor winding section when it is turned off and then to supply the energy to the next motor winding section to be turned on, thus reducing the driving energy needed for the motor and also reducing the current rise and fall times in the windings.

17 Claims, 5 Drawing Figures

STEPPING MOTOR CONTROL CIRCUIT

BACKGROUND OF THE INVENTION

The invention relates to a circuit for controlling currents flowing through windings of stepping motors of the type in which both ends of all the windings are individually accessible for the purpose of electrical connections. The term "winding" as used herein means winding or winding section.

As is known, stepping motors are used as shaft drives for machine tools, peripheral equipment for computers, clocks or the like. Such stepping motors require a circuit which on the one hand permits the current to rise rapidly to the necessary value in a prescribed sequence in individual motor windings and on the other hand permits the current to drop again rapidly to zero after a given time which is dependent on the stepping frequency.

There are already known various circuits for control of this kind for stepping motors. Such known circuits are described, for example, in the technical reference book *The Stepping Motor Handbook*, published by Sigma Instruments, Inc., Braintree, Mass., U.S.A. cop. (1972), German Ed., cop. (1973), hereinafter referred to as the "Handbook".

(A) An R-L-circuit is one of the circuits described in the Handbook. Here an ohmic resistance is connected in series with the motor winding and a high voltage is applied to this combination. This resistance has two different effects. It limits the current to the necessary value and in accordance with the law $\tau = L/R$, ensures a small motor constant, which leads to a rapid rise in the current. In order to obtain a rapid current disconnection, a resistor or Zener diode is connected in series with a normal diode in the free running circuit. The circuit can be used both for stepping motors permitting a separate access to all the winding ends and for stepping motors which give access to only half of all the winding ends and permit a common neutral point or partial neutral points. The principle is shown in FIG. (a), representation 36 on p. 47 of the Handbook.

(B) A constant current chopper control circuit is described in FIG. (b), representation 36 on page 47 of the Handbook. This circuit fulfils the requirement of rapid switching on, maintaining of constant current, rapid switching off, and relatively small losses. However, it requires a high voltage source and a relatively complicated current control circuit for each motor winding.

(C) A rapid excitation circuit (superimposition of an auxiliary voltage) is described in FIG. (c), representation 36 on page 47 of the Handbook. This circuit fulfils the requirements made in (B) above, but requires one current measuring circuit per winding and two voltage sources, which one has a low voltage and the other a high voltage.

(D) A circuit described in FIG. (d), representation 36 on page 47 of the Handbook, relates to a voltage control intended for stepping motors. The advantages and disadvantages of the control are described in detail on pages 56 to 58 of the Handbook. U.S. Pat. No. 3,560,821 also describes a stepping motor control of this type. One disadvantage of this circuit is that due to the relatively long response time, at the most from 3.3 ms (milliseconds) to 10 ms, of the voltage regulating circuit caused by the multiple line frequency of from 100 Hz (Herz) to 300 Hz, there are system-dependent power restrictions with regard to the starting and stopping behaviour of the stepping motor. Another disadvantage is that the stepping frequency change speed on passing from high to low stepping frequencies must also be limited, because otherwise there would be excessive switching currents in the just-activated windings leading to magnetic saturation and high losses in the switching transistors through exceeding of the saturation voltage between collector and emitter. These effects occur because the smoothing capacitor located at the voltage regulating output must discharge from a high to a low voltage on passing from high to low stepping frequencies.

SUMMARY OF THE INVENTION

It is desired for the operation of stepping motors, of the type in which access is given to all winding ends, that the control circuit have the following control characteristics:

The current must rise to the desired value in the shortest possible time on exciting a winding.

During the desired current flow time in the winding, the losses must be as small as possible.

The current must be switched off as quickly as possible at any selected given time.

According to the present invention, in order to obtain a rapid rise or fall in the current in the winding to be switched on or off, the energy is stored in a second magnetic circuit. The energy of the second magnetic circuit, which can be either the motor winding which is still active but is about to be switched or an external inductor operated as an auxiliary winding, is brought into the first motor winding to be switched on by means of an intermediate energy store constructed as a capacitor. The maximum steepness of the rising and falling sides of the current pulses is given by the size of the capacitor functioning as the intermediate store, because the energy contents $E_H$ and $E_{Mot}$ of the auxiliary and motor winding inductors $L_H$ and $L_{Mot}$ are given by the law $$E_H = \frac{I_H^2}{2} \cdot L_H \text{ and } E_{Mot} = \frac{I_{Mot}^2}{2} \cdot L_{Mot}.$$

At the end of the switching over process, the motor current is supplied by the line voltage source via the separator diodes connected in parallel to the storage capacitors.

The advantages obtained according to the invention are in particular that by using a circuit having only one supply source and no current measuring circuits, it is possible to operate stepping motors which permit access to all winding ends with virtually the same high level of efficiency and equally good static and dynamic characteristics as is possible with the much more complicated circuits of types (B) and (C) described above.

DESCRIPTION OF THE PREFERRED EMBODIMENTS

Figure 1:
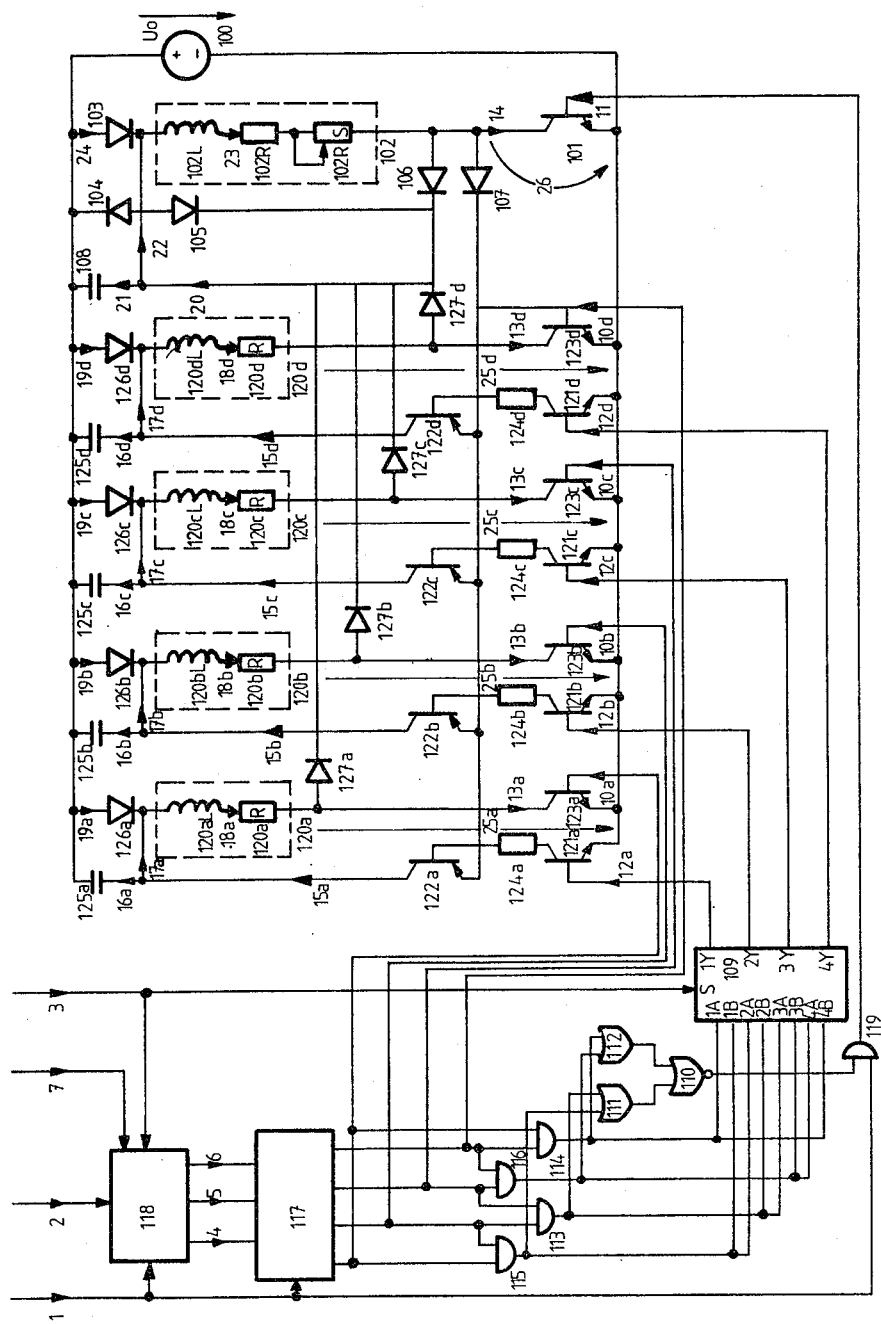
FIG. 1 is an electrical circuit diagram of a stepping motor control for half-stepping operation of motors in accordance with a preferred embodiment of the present invention.

FIG. 1 shows a stepping motor with full four motor windings 120a, 120b, 120c and 120d, comprising in each case four winding inductors 120aL, 120bL, 120cL, 120dL and the ohmic winding resistances 120aR, 120bR, 120cR, 120dR. Element 102 which acts as an auxiliary winding comprises an inductor 102L with its ohmic internal resistance 102R and a variable series resistance 102RS which can be used for current adaptation purposes. All the motor windings 120a, 120b, 120c, 120d, together with the auxiliary winding 102 are connected to the common free-running branch, comprising diode 104 and Zener diode 105, which becomes operative on switching off the whole system, via diodes 127a, 127b, 127c, 127d, as well as diode 106. On switching on of one or two of the four motor windings 120a, 120b, 120c, 120d and the auxiliary winding 102 by means of control signals 10a, 10b, 10c, 10d and 11, which act on the bases of electronics switch 123a, 123b, 123c, 123d and 101 constructed as a transistor in FIG. 1, a voltage source 100 with voltage source $U_o$ drives one or two of the currents 13a, 13b, 13c, 13d, together with current 14 via one or two of the separator diodes 126a, 126b, 126c, 126d and 103 in one or two of the motor windings, as well as in the auxiliary winding and via one or two of the electronic circuits 123a, 123b, 123c, 123d and 101. Control signals 10a, 10b, 10c and 10d are taken from a read-only memory 117, whose address signals 4, 5, 6 are the output signals of a bidirectional binary counter 118.

On releasing the operation of the stepping motor control system by means of the operating control signal 1, control signal 11 always switches on switch 101 when one of the motor phases is switched off. Electronic switch 101 then carries current 14 until the next motor phase is switched on, at which time signal 11 switches off switch 101.

Figure 2:
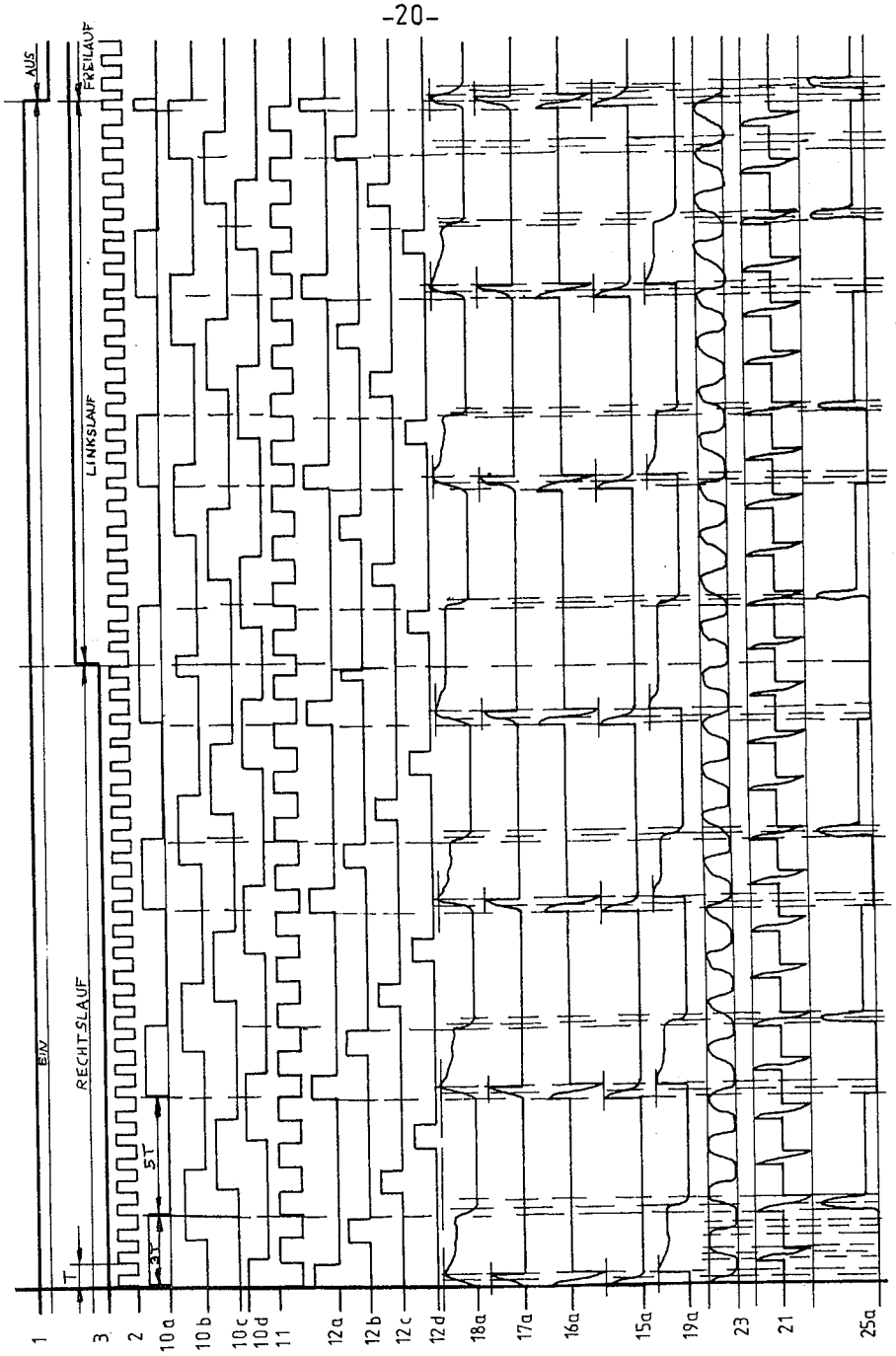
FIG. 2 is a graphical representation of various current and voltage forms present at particular points of the circuit of FIG. 1 in the course of half-stepping operation of motors with the circuit.

The production of control signal 11 from control signals 1, 10a, 10b, 10c, 10d by means of AND gates 113, 114, 115, 116, 119, OR gates 111, 112 and NOR gate 110 can clearly be seen in FIG. 1 and the pulse diagram of FIG. 2. Binary counter 118 which functions as a ring counter is controlled by logic signals 2, which represent the stepping frequency and by the counting direction signal 3, which determines the rotation direction of the motor. Signal 3 also serves as a control signal for data selector 109 and determines whether the logic signals at inputs 1A, 2A, 3A, 4A or the logic signals at inputs 1B, 2B, 3B, 4B are connected to outputs 1Y, 2Y, 3Y, 4Y. T is the cycle time of the stepping frequency. Control signals 12a, 12b, 12c, 12d switch on switches 121a, 121b, 121c, 121d for a cycle time T at the beginning of the current flow times of length 3T desired for the individual motor phases, whereby for the same period the said switches maintain the corresponding electronic switches 122a, 122b, 122c, 122d for the current flow closed via resistances 124a, 124b, 124c, 124d.

The currents 15a, 15b, 15c, 15d flowing across switches 122a, 122b, 122c, 122d are divided up into partial currents 16a, 16b, 16c, 16d on the one hand and 17a, 17b, 17c, 17d on the other. The partial currents 16a, 16b, 16c, 16d flow in capacitances 125a, 125b, 125c, 125d which are serving as the intermediate energy store and which after the zero passage of current 16a, 16b, 16c, 16d release their charge again. On switching off of one of the switches 123a, 123b, 123c, 123d, controlled by signals 10a, 10b, 10c, 10d the energy stored in the corresponding motor winding is recharged on the auxiliary winding 102 via one of the diodes 127a, 127b, 127c, 127d by means of the capacitor 108 serving as an intermediate energy store.

Following energy recharging, diode 103 takes over the current flow in the auxiliary winding and thus maintains its energy level.

Electronic switches 121a, 121b, 121c, 121d, 122a, 122b, 122c, 122d, 123a, 123b, 123c, 123d, 101 represented as bipolar transistors can in principle also be constructed as Darlington transistors, field effect transistors or thyristors.

It is now assumed that an electronic control circuit or an electronic computer, which are not shown and do not form part of the actual invention, supply the input signals 1, 2 and 3 according to FIGS. 1 and 2. The logic control signal 1, which is the operating control signal, by means of its logic value 1 renders active the address signals 4, 5 and 6 at read-only memory 117, so that the latter carries signals 10a, 10b, 10c, 10d on its output lines. This state of the operating control signal also permits the output signal produced in NOR gate 110 to appear as signal 11 and is able to control switch 101. The operating control signal 1 acts on binary counter 118 in such a way that on passing from logic 0 to logic 1 of signal 1, binary counter 118 starts to count at its outputs 4,5,6 with a value 7, given by a not-shown electronic control signal and which value can here be an integer between 0 and 7.

On giving beforehand the constant stepping frequency with cycle T shown in FIG. 2, control signals 10a, 10b, 10c, 10d are produced by means of binary counter 118 and read-only memory 117. No more detailed explanation is required of this. For the represented stepping motor operated on a half-stepping basis, a complete switching sequence lasts 8 cycles of length T.

It can be seen that a motor phase carries current for a time of length 3T, followed by an interval of length 5T. Furthermore, in connection with the operation of the motor, the phase sequence also takes place cyclically and for clockwise rotation corresponds e.g. to the sequence ad, a, ab, b, bc, c, cd, d. The next switching state would be a d again. For counterclockwise rotation, the switching sequence would be d, cd, c, bc, b, ab, a, ad. The auxiliary phase must then always carry current when only one motor phase carries current, independently of the desired rotation direction of the motor. The necessary control signal 11 is obtained by means of the OR gates 111, 112, the NOR gate 110 and the AND gates 113, 114, 115, 116. The control signals 12a, 12b, 12c, 12d necessary for the control of switch 121a, 121b, 121c, 121d are obtained by means of simple AND operations and rotation direction-dependent selection from control signals 10a, 10b, 10c, 10d.

The switching on and off processes of a motor winding will now be described relative to motor winding 120a. By means of the variable series resistance 102RS, the stationary current value in the auxiliary winding is adjusted in such a way that its energy content exceeds that of the motor windings, in order to compensate the losses on switching on the latter and additionally to reach transient current peaks of 150% of the stationary value.

FIG. 2 shows the current curves 18a in motor winding 120a, the free-running current 15a of the auxiliary winding partial current 17a, current 16a of the intermediate energy store 125a, and diode current 19a. In addition, there are shown the current 23 through auxiliary winding 102, the current 21 in the intermediate store 108, and the collector-emitter voltage 25a of the switching transistor 123a.

Figure 3:
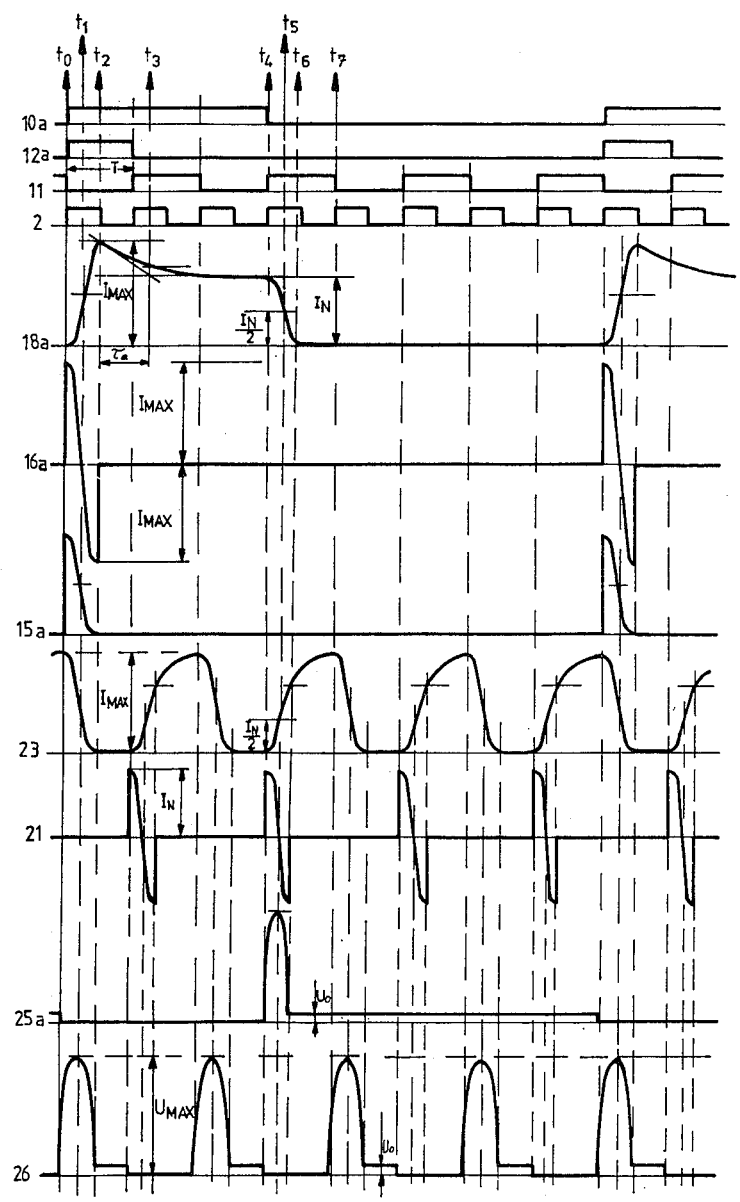
FIG. 3 is a graphical representation of control signals of the circuit of FIG. 1 for switching in and out the windings of the stepping motors being operated by the circuit and also of various the current and voltage forms which appear at various points in the circuit when switching.

FIG. 3 shows the control signals as well as certain current and voltage curves of the elements involved in switching the motor winding 120a on and off.

At time $t_o$, switches 123a and 122a are closed by means of control signals 10a and 12a. Simultaneously, switch 101 is opened by means of control signal 11. Current 23, which up to this time has risen to its stationary final value $I_{MAX}$ in auxiliary winding 102 in time interval $t_1$, $t_2$, is now forced to follow its path through a first circuit via diode 107, switch 122a, intermediate storage capacitor 125a, and diode 103. It flows through a second circuit via diode 107, switch 122a, motor winding 120a, switch 123a, supply voltage source 100, and diode 104. A sinusoidal voltage path and a cosine-shaped current path are developed across the intermediate storage capacitor 125a. At time $t_1$, capacitor 125a passes through its current zero and, consequently, its voltage and energy maximum. The current 18a flowing in the motor winding which has just been switched on, and current 15a from the auxiliary winding are at this time precisely equal. As time advances, capacitor 125a is completely discharged in time interval $t_1$, $t_2$ by a third circuit via capacitor 125a, motor winding 120a, switch 123a and supply voltage source 100. By the end of this time interval, current 15a reaches the value 0 via the second circuit 107, 122a, 120a, 123a, 100, 103, 102 already active in the first time interval $t_1$, $t_2$. By time $t_2$, the current in the motor winding 120a, which has just been switched on, has risen to its maximum value $I_{MAX}$, which can be e.g. 50% higher than the nominal value $I_N$. In time $t_2$, $t_3$, which corresponds to the duration $T_a$ of the motor time constant ($T_a=120aL/120aR$), the motor current 18a drops by the value $$\frac{I_N}{2} \cdot (1 - \frac{1}{e})$$

to the value $$I_N \cdot (1 + \frac{1}{2e})$$

and in the interval $T_3$, $t_4$ tends towards its stationary value $I_N$.

Before the switching off process of motor winding 120a starts at time $t_4$, motor winding 120d is rapidly switched off by means of the auxiliary winding and control signals 10d and 11 and motor winding 120b is rapidly switched on with control signals 10b, 12b and 11. At time $t_o+T$, switch 122a, which according to FIG. 3 even at time $t_o+I/2$ no longer carries a current, is opened.

In time interval $t_2$, $t_4$ motor current 18a flows only through a fourth circuit via elements 120a, 123a, 100, 126a. At time $t_4$, switch 123a is opened by means of the control signal 10a and switch 101 is closed by means of control signal 11.

Current 18a of value $I_N$, which at this time flows in motor winding 120a, is forced to divide up in time interval $t_4$, $t_5$ and flows through a fifth circuit via diode 127a, storage capacitor 108, and diode 126a. It flows through a sixth circuit via diode 127a, auxiliary winding 102, switch 101, supply voltage source 100, and diode 126a. A sinusoidal voltage path and a cosine-shaped current path according to FIG. 3 are developed across capacitor 108, which serves as the intermediate energy store. At time $t_5$, capacitor current 21 has its zero passage and the capacitor current has its maximum. The rising current in the auxiliary phase and the falling current 18a of the motor winding to be switched off are equal at time $t_5$. As time advances, capacitor 108 is completely discharged in time interval $t_5$, $t_6$ through a seventh circuit via capacitor 108, auxiliary winding 102, switch 101, and supply voltage source 100. By the end of this time interval, the current 20 reaches the zero value via the sixth circuit 127a, 102, 101, 100, 126a, 120a, which is already active in time interval $t_4$, $t_5$. The current in the auxiliary winding 102, which has just been switched on, has not quite reached value $I_N$ by time $t_6$, because losses still occur in the elements.

From time $t_6$, the supply voltage source 100 drives current 23 in the auxiliary winding through an eight circuit via diode 103, auxiliary winding 102, switch 101, and supply voltage source 100 towards its stationary final value $I_{MAX}$. The effective time constant $T_H$ gives $$T_H = \frac{102L}{(102R + 102RS)}.$$

At time $t_7$, the abovedescribed process is repeated, but for motor winding 120c if clock-wise rotation is assumed and for motor winding 120d if counter-clockwise rotation is required (see FIG. 2).

After switching off of all the motor windings and the auxiliary winding by means of an operating control signal 1 (transition from logic 1 to logic 0 in FIG. 2), the free-running currents of motor windings 120a and 120b flow in capacitor 108, as well as through a ninth circuit via Zener diode 105 and diode 104, if the capacitor voltage has reached the Zener voltage plus diode flow voltage.

When currents 18a and 18b have reached the zero value of value C, capacitor 108 still carries in it energy $U_Z^2/2C$, in which $U_Z$ stands for the Zener voltage. The capacitor can be discharged by means of diode leakage currents or via a resistor, not shown in FIG. 1, which is connected parallel thereto.

Figure 4:
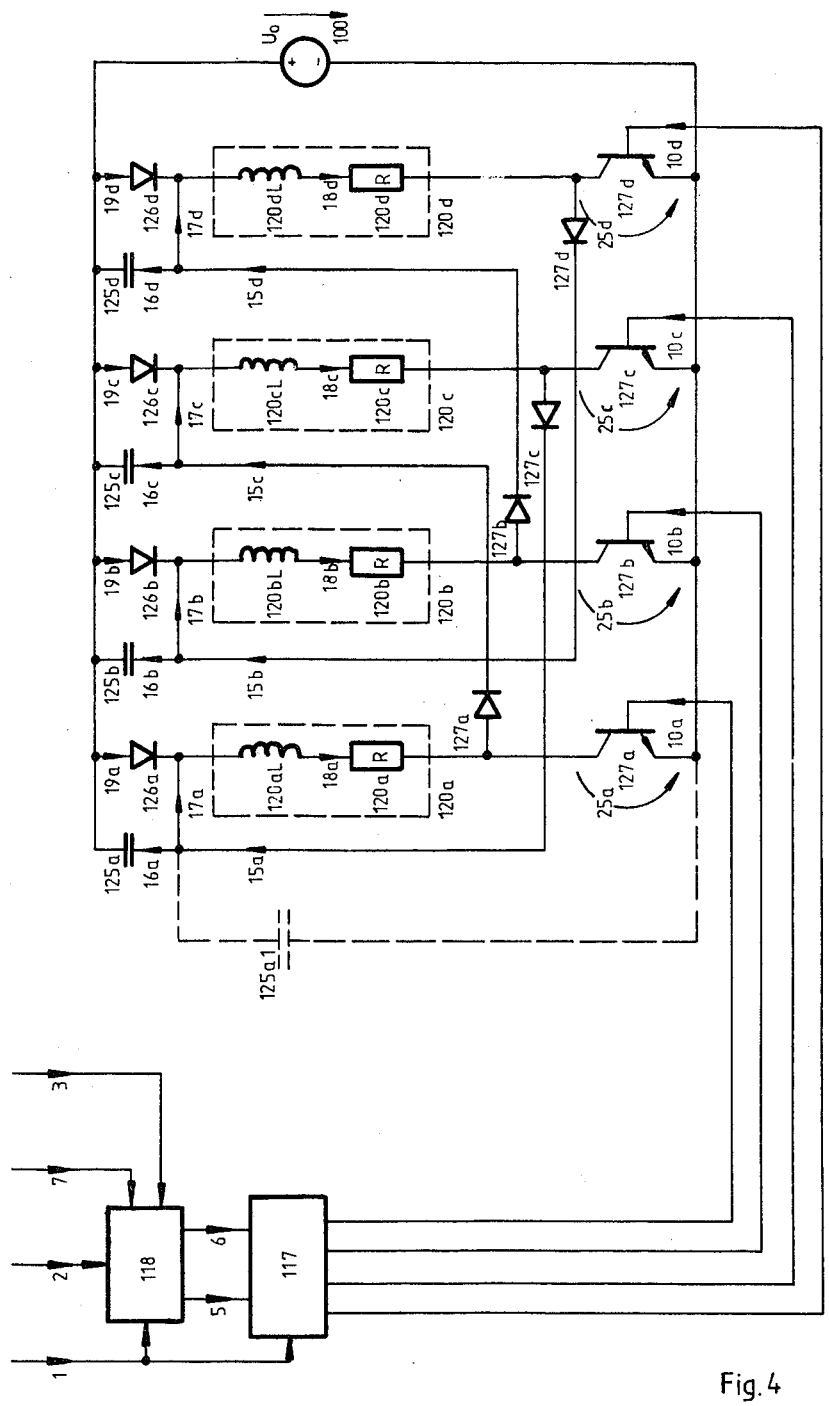
FIG. 4 is an electrical circuit diagram of a stepping motor control for full-stepping operation of motors in accordance with another embodiment of the present invention.

FIG. 4 shows a variant of the circuit according to the invention for full-stepping operation of e.g. four-phase stepping motors. In full-stepping operation, at least one current-carrying motor winding is switched off and, simultaneously, at least one hitherto currentless motor winding is switched on for each stepping pulse.

Figure 5:
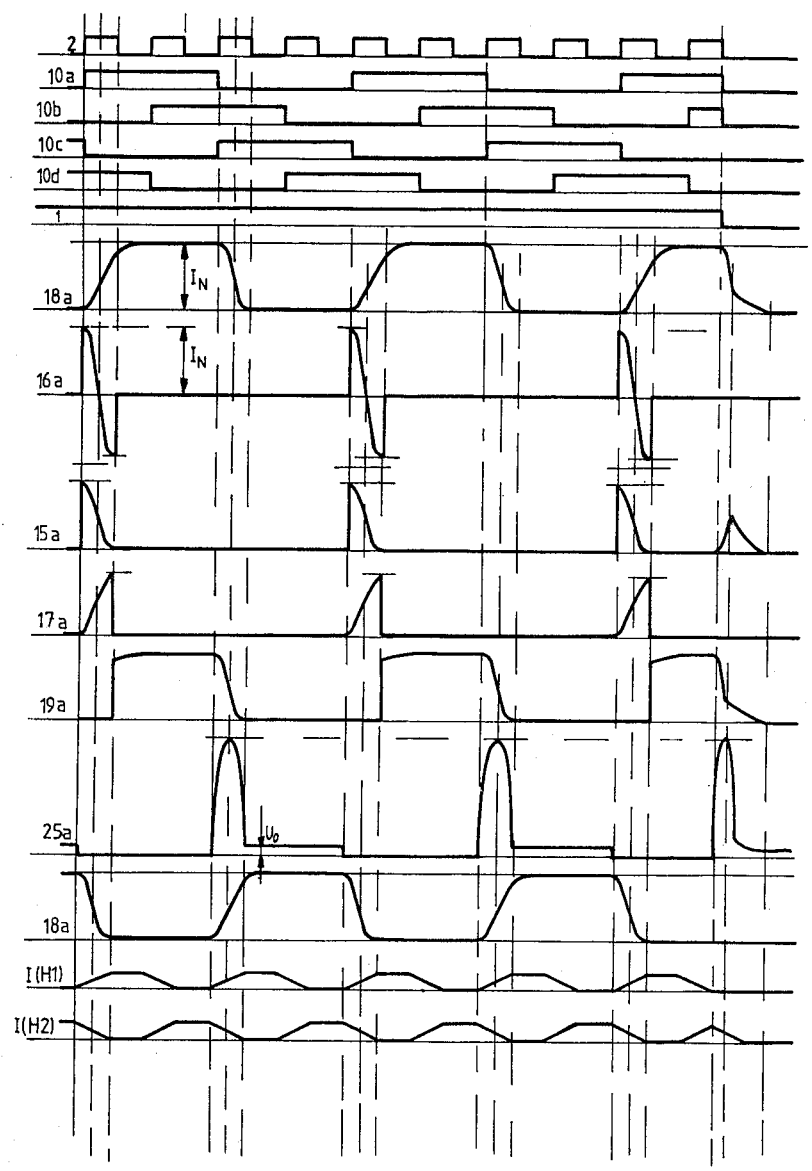
FIG. 5 is a graphical representation of various current and voltage forms present at particular points of the circuit of FIG. 4 in the course of full-stepping operation of motors with the circuit.

The current and voltage curves relative to FIG. 4 are shown in FIG. 5. As can be seen in FIG. 4, this circuit can be much simpler since it is for operating in a full-stepping mode. The function of the auxiliary winding as in FIGS. 1 to 3 is in FIGS. 4 and 5 provided by the disconnection of the motor winding.

A more detailed description of this variant will not be provided here, because the circuit is simpler and also because its operation is readily apparent from a study of the description of FIG. 1 for the semi-stepping operation. Capacitor 125a 1 shown by dotted lines in FIG. 4 can replace capacitor 125a, without this changing the basic principle of the circuit. The circuit of FIG. 4 has the characteristic that it does not lead to an increase in the current at the start of the switching on of the motor winding, as is possible with the circuit of FIG. 1.

In order to obtain a current form 18a according to FIG. 3 in a full-stepping operation, the circuit of FIG. 4 would have to be extended by two auxiliary windings H1, H2 having a larger energy content than the motor windings. Auxiliary winding H1 would be charged by motor windings 120a, 120c and would supply its energy to motor windings 120b and 120d (see curve I (H1) in FIG. 5). Auxiliary winding H2 would be charged by motor windings 120b, 120d and would supply its energy to motor windings 120a and 120c (see curve I (H2) in FIG. 5). I (H1) and I (H2) are the currents in auxiliary windings H1 and H2.

By means of suitable logic connections of the control signals 10a, 10b, 10c, 10d, all the further control signals can be derived for the additionally required 6 switches.

I claim:

1. An electrical circuit to generate short current rise and decay times of current flowing through the energizing windings (120aL-dL) of a set of windings of a stepping motor,
    said windings have accessible winding terminals and wherein, upon beginning and end of the desired current flow pulses, a terminal of a newly, to be connected, winding is interconnected with a terminal of a winding through which current flow is to be disconnected, comprising
    a plurality of controlled switches (123a-d; 127a-d), one each associated with the motor windings (120), and controlling current flow therethrough;
    and a control circuit (109, 117, 119) controlling selective open and closing of the controlled switches, and transfer of operating energy from one winding to another;
    a plurality of capacitors (125a-d), one each connected to one terminal for each of the windings;
    an inductance (102; 120aL-dL) and having current flowing therethrough which is being interrupted upon transfer of operating energy between windings;
    and a controlled circuit connection from a terminal of each of the windings to the inductance and effective
    (a) upon connection of a winding, to interrupt current flow through said inductance and connect said inductance to a terminal of the newly conductive winding and the associated capacitor (125) of the newly conductive winding to be energized, and
    (b) upon disconnection of a conductive winding, to connect the then conductive winding with one terminal of the next newly conductive winding, and the associated capacitor.

2. Circuit according to claim 1, wherein the controlled circuit comprises
    a first circuit including a common diode (107), a plurality of controlled current transfer switches (122a-122d) having their main current carrying paths connected to associated respective capacitors (125a-d), a common connection line and an auxiliary inductance (102) connected to the common connection line in a closed series circuit;
    and a second circuit including
    said controlled switches, in parallel (123, 127) and the motor windings (120) serially connected thereto, a source of voltage (100) and a branch circuit parallel to said source of voltage including said auxiliary inductance, and means including a controlled switch (101) placing said auxiliary inductance in circuit connection in parallel to said source (100) in timed intervals ($t_0$, $t_1$) to provide a cosine-shaped decay in the auxiliary inductance and a negative cosine-shaped current rise in the respective motor winding (120) which is to be connected upon conduction of the respective controlled switch.

3. Circuit according to claim 2 further including a third circuit comprising the respective capacitor (125), the motor winding (120), the controlled switch (123) and said source (100);
    and wherein said means including the controlled switch (101) is effective to provide for a continued cosine-shaped current decay in the auxiliary inductance (102) in a later time interval ($t_1$, $t_2$) and the negative cosine-shaped current rise in the respective motor winding, and terminate said rise at a later instant of time ($t_2$).

4. Circuit according to claim 3, further comprising a fourth current circuit including
    a respective motor winding (120), the associated controlled switch (123), said source of voltage (100), and energized during the operating interval of the stepping motor by said control circuit, and unidirectional current circuit means (126a-126d) insuring current flow through the respective winding in a commanded direction.

5. Circuit according to claim 4, further including a fifth circuit including a common capacitor (108), a plurality of diodes (127a-127d), one each connected to a respective motor winding and all connected to one terminal of said common capacitor (108);
    said unidirectional current circuit means (126) being connected to the other terminal of the common capacitor (108) and to respective motor windings (120);
    and a sixth circuit including the diodes (127), the auxiliary inductance (102), said means including the controlled switch (101), said source (100), and the respective unidirectional current circuit means (126) and the respective motor winding (120),
    and wherein the respective controlled switches and current transfer switches and said means including the controlled switch (101) are controlled in a subsequent time interval ($t_4$, $t_5$) to effect a cosine-wave shaped current decay in a respectively connected motor winding, and a negative cosine wave-shaped current rise in the auxiliary inductance (102).

6. Circuit according to claim 5, further including a seventh circuit including the common capacitor (108), the auxiliary inductance (102), the means including the controlled switch (101) and the source (100) and controlled in a subsequent time interval ($t_5$, $t_6$) to continue the cosine wave-shaped decay of current in the respectively connected motor winding and terminating said current flow at a subsequent time instant ($t_6$), said sixth circuit continuing the negative cosine wave-shaped current rise in the auxiliary inductance (107) and effecting slow rise according to an exponential function at the subsequent time instant ($t_6$).

7. Circuit according to claim 6, further comprising an eighth circuit including a second common diode (103) connected in series with said auxiliary inductance (102) and said means including the controlled switch (101) and the source (100), the means including the controlled switch being controlled in a further subsequent time interval ($t_6$, $t_7$) to effect rise of current through the auxiliary inductance (102) in accordance with an exponential curve to a stationary maximum value ($I_{MAX}$) at a rate and with a time constant determined by the circuit values of said eighth circuit.

8. Circuit according to claim 7, further comprising means establishing a ninth circuit including said respective motor windings (120), the associated diodes (127a–d) the auxiliary inductance (102), a third common diode (106), a breakdown diode (105) and a fourth common diode (104), and the respective current control diodes (126) connected to the motor windings (120) and taking over current flow upon opening of said current transfer switches (122) and said controlled switches (123) and said means including the controlled switch (101).

9. Circuit according to claim 1, wherein the inductance (102) comprises an auxiliary inductance and the controlled circuit connection provides a common circuit connection from said auxiliary inductance (102) to the respective motor windings and the respective capacitors;

and wherein said auxiliary inductance includes an inductance coil (102L) and a controlled resistor (102RS) to provide for controlled wave form of the current flow of the motor windings upon connection of electrical energy thereto and adjustment of the exponential portion of current rise therethrough.

10. Circuit according to claim 9, further including means including a controlled switch (101) connected in series with the auxiliary winding and said controllable resistance, said means including said controlled switch being connected to be controlled by said control circuit;

a common capacitor (108) and a common diode (103) connected in parallel circuit, said parallel circuit being serially connected with the auxiliary inductance, said auxiliary inductance, parallel circuit, and means including said controlled switch being connected across a source of operating voltage (100).

11. Circuit according to claim 9, wherein a pair of auxiliary inductances are provided to generate short current rise and current decay times and permit excess current upon turn-on of current flow through a respective winding, said second auxiliary inductance being essentially similar to the auxiliary inductance.

12. Circuit according to claim 1, wherein the control circuit provides for selective energization of the respective motor windings in full-step or half-step operation.

13. Circuit according to claim 1, wherein said inductance comprises the inherent inductance of the respective motor windings.

14. Circuit according to claim 1, wherein the inductance comprises an auxiliary inductance (102), and a common capacitor (108) is provided having one terminal connected in circuit with one terminal of said auxiliary inductance;

and means connecting the conductive winding, upon disconnection, to said auxiliary inductance and the common capacitor.

15. Circuit according to claim 14, further including a controlled switch (101) connected in series with the auxiliary winding (102), said controlled switch being connected to and controlled by said control circuit (109, 117, 119);

and a common diode (103) connected in parallel circuit with said common capacitor (108), said parallel circuit being serially connected with the auxiliary inductance, said auxiliary inductance, parallel circuit, and controlled switch being connected across a source of operating voltage (100) and to said controlled switches (123) to supply current to a respective winding (120) upon conduction of one of the controlled switches.

16. Circuit according to claim 15, further including a plurality of controlled current transfer switches (122a–122d) having their main current carrying path connected to associated respective capacitors (125a–d) and to the parallel circuit (108, 103), said switches being additionally connected (107) to the inductance at a terminal remote from said parallel connection, said controlled current transfer switches being connected to and controlled for conduction by said control circuit (109, 117, 119).

17. Circuit according to claim 15, further including a plurality of diodes (127a–127d) respectively connected to the respective windings (120a–d) and to the junction between said parallel circuit (108, 103) and the auxiliary inductance (102) to provide for exchange of energy between said windings and the auxiliary inductance in one direction.

* * * * *